United States Patent
Zhou et al.

(10) Patent No.: US 12,159,005 B2
(45) Date of Patent: Dec. 3, 2024

(54) TOUCH PANEL AND DISPLAY APPARATUS

(71) Applicant: Hefei Visionox Technology Co., Ltd., Anhui (CN)

(72) Inventors: Qi Zhou, Hefei (CN); Bing Tan, Hefei (CN); Junfeng Li, Hefei (CN); Chunyan Wu, Hefei (CN); Fei Xie, Hefei (CN)

(73) Assignee: HEFEI VISIONOX TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 18/462,654

(22) Filed: Sep. 7, 2023

(65) Prior Publication Data
US 2023/0418407 A1 Dec. 28, 2023

Related U.S. Application Data

(63) Continuation of application No. PCT/CN2022/108171, filed on Jul. 27, 2022.

(30) Foreign Application Priority Data

Nov. 30, 2021 (CN) .......................... 202111444944.4

(51) Int. Cl.
  G06F 3/041 (2006.01)
  G06F 3/044 (2006.01)

(52) U.S. Cl.
  CPC ........ G06F 3/04164 (2019.05); G06F 3/0446 (2019.05); *G06F 2203/04102* (2013.01)

(58) Field of Classification Search
  CPC .................................................... G06F 3/0446
  See application file for complete search history.

(56) References Cited

U.S. PATENT DOCUMENTS

2015/0185928 A1* 7/2015 Son .................. G06F 3/0445
                                                             345/174
2017/0031488 A1* 2/2017 Shim ................ G06F 3/044
(Continued)

FOREIGN PATENT DOCUMENTS

CN       103472944 A      12/2013
CN       110879640 A       3/2020
(Continued)

OTHER PUBLICATIONS

International Search Report issued Oct. 12, 2022, in corresponding International Application No. PCT/CN2022/108171, 4 pages.
(Continued)

*Primary Examiner* — Nan-Ying Yang
(74) *Attorney, Agent, or Firm* — Maier & Maier, PLLC (57) ABSTRACT

A touch panel and a display apparatus. The touch panel includes a touch area and a peripheral area arranged surrounding the touch area, the touch panel further includes: a first metal layer; a second metal layer; two or more insulating layers arranged in stack with the first metal layer and the second metal layer in the first direction; in which the two or more insulating layers includes one or more organic material layers, a part of at least one of the one or more organic material layers located in the touch area is provided with one or more hollow slots, and in the first direction, an orthographic projection of the at least one of the one or more organic material layers provided with the hollow slots covers at least part of the touch electrodes.

20 Claims, 5 Drawing Sheets

(56) References Cited

U.S. PATENT DOCUMENTS

| | | | |
|---|---|---|---|
| 2018/0004027 A1* | 1/2018 | Lin | G02F 1/133516 |
| 2018/0164933 A1* | 6/2018 | Jun | H10K 59/87 |
| 2019/0097171 A1 | 3/2019 | Park | |
| 2021/0333967 A1* | 10/2021 | Feng | G06F 3/04164 |

FOREIGN PATENT DOCUMENTS

| | | |
|---|---|---|
| CN | 112416171 A | 2/2021 |
| CN | 112462975 A | 3/2021 |
| CN | 112905036 A | 6/2021 |
| CN | 114115614 A | 3/2022 |

OTHER PUBLICATIONS

Office Action issued Nov. 18, 2022, in corresponding Chinese Application No. 202111444944.4, 15 pages.
Office Action issued May 17, 2023, in corresponding Chinese Application No. 202111444944.4, 7 pages.

\* cited by examiner

TOUCH PANEL AND DISPLAY APPARATUS

CROSS REFERENCE TO RELATED APPLICATION

The present application is a continuation of International Application No. PCT/CN2022/108171 filed on Jul. 27, 2022, which claims priority to Chinese Patent Application No. 202111444944.4 filed on Nov. 30, 2021, both of which are incorporated herein by reference in their entireties.

TECHNICAL FIELD

The present application relates to the field of display technology, and particularly, to a touch panel and a display apparatus.

BACKGROUND

With the development of display technology and the popularity of electronic products, people's requirements for the functions of display panels are higher and higher, and bendable display panels are the current development trend of the display industry and mostly integrated with touch function, therefore, bendable touch panels have been developed.

For the current bendable touch panel, in order to ensure the bending performance of the touch layer, the insulating layer in the touch layer are usually made of organic materials, although this can improve the bending performance, but when metal are deposited in a large area of organic material layer of the touch area, the atmospheric viscosity of the touch area in the touch panel will be increased in the process of metal patterning and the metal residues affect the metal patterning, the touch function is failed.

SUMMARY

Embodiments of the present application provide a touch panel and a display apparatus, in which the touch panel can satisfy the touch function requirement and reduce the probability of touch function failure.

In one aspect, the embodiments of the present application provide a touch panel including a touch area and a peripheral area arranged surrounding the touch area, the touch panel further including: a first metal layer comprising a plurality of bridging lines; a second metal layer spaced apart from the first metal layer in a first direction and including a plurality of touch electrodes, at least part of the touch electrodes being electrically connected with the bridging lines through one or more vias; two or more insulating layers arranged in stack with the first metal layer and the second metal layer in the first direction, at least one of the two or more insulating layers being located between the first metal layer and the second metal layer; and in which the two or more insulating layers comprise one or more organic material layers, a part of at least one of the one or more organic material layers located in the touch area is provided with one or more hollow slots, and an orthographic projection of the at least one of the one or more organic material layers provided with the hollow slots in the first direction covers an orthographic projection of at least part of the touch electrodes in the first direction.

In another aspect, the embodiments of the present application provide a display apparatus including: a display panel including an array substrate, a light-emitting layer, and an encapsulation layer being stacked, the light-emitting layer including a pixel definition layer with pixel openings and light-emitting elements located within the pixel openings, the encapsulation layer being arranged at a side of the light-emitting layer away from the array substrate and covering the light-emitting layer; and the above touch panel arranged at a side of the encapsulation layer away from the light-emitting layer.

According to the touch panel and the display apparatus provided by the embodiments of the present application, the touch panel includes the first metal layer, the second metal layer, and the two or more insulating layers, the provision of the touch electrodes and the bridging lines can satisfy the touch control requirement, a part of at least one organic material layer located in the touch area is provided with the hollow slots, and in the first direction, the orthographic projection of the organic material layer provided with the hollow slots covers at least part of the touch electrodes, the provision of the insulating layers can protect the first metal layer and the second metal layer. The two or more insulating layers include one or more organic material layers, which is beneficial for the bending of the touch panel. A part of at least one organic material layer located in the touch area is provided with the hollow slots, and in the first direction, the orthographic projection of the organic material layer provided with the hollow slots covers at least part of the touch electrodes, the touch electrodes can be protected, which is beneficial for their bending. The provision of the hollow slots can reduce the coverage area of the organic material layer in the touch area, therefore when the metal layers are patterned to form the touch electrodes and/or the bridging lines, the atmospheric viscosity can be decreased to avoid short circuit caused by the metal residues, etc., and thus to reduce the probability of touch function failure.

DETAILED DESCRIPTION

Organic materials are more flexible and less susceptible to deformation when bending, and for the existing touch panels, in order to ensure the bending performance, the insulating layer for insulating and protecting the metal layer are usually made of organic materials. Although the bending performance can be improved, shortcomings still exist, for example, when metals are deposited in a large area of organic material layer of the touch area, metal residues are generated in the process of metal patterning and cause short circuits due to metal adhesion, and thus the touch function is failed.

In order to solve the above problems, the embodiments of the present application provide a touch panel, which can satisfy the touch control requirement and reduce the probability of touch function failure. For a better understanding of the present application, the touch panel and the display apparatus according to the embodiments of the present application are described in detail below with reference to FIGS. 1 to 12.

Referring to FIGS. 1 to 4, the embodiments of the present application provide a touch panel 100 including a touch area MM and a peripheral area NN arranged surrounding the touch area MM, the touch panel 100 further includes a first metal layer 10, a second metal layer 20, and insulating layers 30, in which the first metal layer 10 includes a plurality of bridging lines 11 which are spaced apart. The second metal layer 20 is spaced apart from the first metal layer 10 in a first direction X and includes a plurality of touch electrodes 21, and at least part of the touch electrodes 21 are electrically connected with the bridging lines 11 through one or more vias 34. Two or more insulating layers 30 are arranged in stack with the first metal layer 10 and the second metal layer 20 in the first direction X, and at least one insulating layer 30 is arranged between the first metal layer 10 and the second metal layer 20. Herein, the two or more insulating layers 30 include one or more organic material layers 31, a part of at least one of the one or more organic material layers 31 located in the touch area MM is provided with one or more hollow slots 33, and an orthographic projection of the organic material layer 31 provided with the hollow slots 33 in the first direction X covers an orthographic projection of at least part of the touch electrodes 21 in the first direction X. The first direction X is the thickness direction of the touch panel 100.

The number of touch electrodes 21 formed on the second metal layer 20 is not specifically limited and may be set according to the touch control requirement. In some optional embodiments, the plurality of touch electrodes 21 formed on the second metal layer 20 may include two or more touch driving electrodes 211a arranged in a matrix and two or more touch sensing electrodes 211b arranged in a matrix, adjacent touch driving electrodes 211a in a same matrix row are electrically connected through one of the connection portion and the bridging line 11, and adjacent touch sensing electrodes 211b in a same matrix column are electrically connected through the other of the connection portion and the bridging line 11. The connection portion is arranged in the same layer as the touch driving electrodes 211a and the touch sensing electrodes 211b, that is, the connection portion may be arranged in the second metal layer 20.

The number of bridging lines 11 formed on the second metal layer 20 may be determined according to the number of the touch driving electrodes 211a or the touch sensing electrodes 211b to be connected, and the bridging lines 11 may also be distributed in a matrix.

The number of the insulating layers 30 is not specifically limited and may be two, three, or even more. Optionally, the plurality of insulating layers 30 may include one or two organic material layers 31, and moreover, all of the insulating layers 30 may be organic material layers 31. If the number of the organic material layers 31 is less than the total number of the insulating layers 30, the remaining of the plurality of insulating layers 30 other than the organic material layers 31 may be inorganic material layers 32.

In addition to the insulating layer 30 arranged between the first metal layer 10 and the second metal layer 20, the insulating layer 30 may be arranged at a side of the first metal layer away from the second metal layer 20 and/or a side of the second metal layer 20 away from the first metal layer 10 in the first direction X.

Optionally, the hollow slot 33 arranged in a part of at least one organic material layer 31 located in the touch area MM may be a round aperture slot, a square aperture slot, a polygonal aperture slot, and the like.

In some optional embodiments, the number of the hollow slots 33 is two or more.

In the first direction X, the orthographic projection of the organic material layer 31 provided with the hollow slots 33 covers at least part of the touch electrodes 21, that is, the orthographic projection of each of this part of the touch electrodes 21 in the first direction X at least partially overlaps with the organic material layer 31.

The touch panel 100 according to the embodiments of the present application includes the first metal layer 10, the second metal layer 20, and the two or more insulating layers 30, the provision of the touch electrodes 21 and the bridging lines 11 can satisfy the touch control requirement, a part of at least one organic material layer 31 located in the touch area MM is provided with the hollow slots 33, and in the first direction X, the orthographic projection of the organic material layer 31 provided with the hollow slots 33 covers at least part of the touch electrodes 21, the provision of the insulating layers 33 can protect the first metal layer 10 and the second metal layer 20. The two or more insulating layers 30 include one or more organic material layers 31, which is beneficial for the bending of the touch panel 100. A part of at least one organic material layer 31 located in the touch area MM is provided with the hollow slots 33, and in the first direction X, the orthographic projection of the organic material layer 31 provided with the hollow slots 33 covers at least part of the touch electrodes 21, the touch electrodes 21 can be protected, which is beneficial for their bending. The provision of the hollow slots 33 can reduce the coverage area of the organic material layer 31 in the touch area MM, therefore when the metal layers are patterned to form the touch electrodes 21 and/or the bridging lines 11, the atmospheric viscosity can be decreased to avoid short circuit caused by the metal residues, etc., and thus to reduce the probability of touch function failure.

When the touch panel 100 according to the embodiments of the present application is applied in a display apparatus, the insulating layer 30 may be arranged at a side of the first metal layer 10 facing the display panel 200 in the first direction X, and this insulating layer 30 is the organic material layer 31 and provided with the hollow slots 33.

In some other implementations, the insulating layer 30 is arranged at a side of the second metal layer 20 facing the display panel, and this insulating layer 30 is the organic material layer 31 and provided with the hollow slots 33.

With the above arrangement, the metal residues can be reduced when the first metal layer 10 and/or the second metal layer 20 are patterned, so as to reduce the probability of touch function failure.

Figure 2:
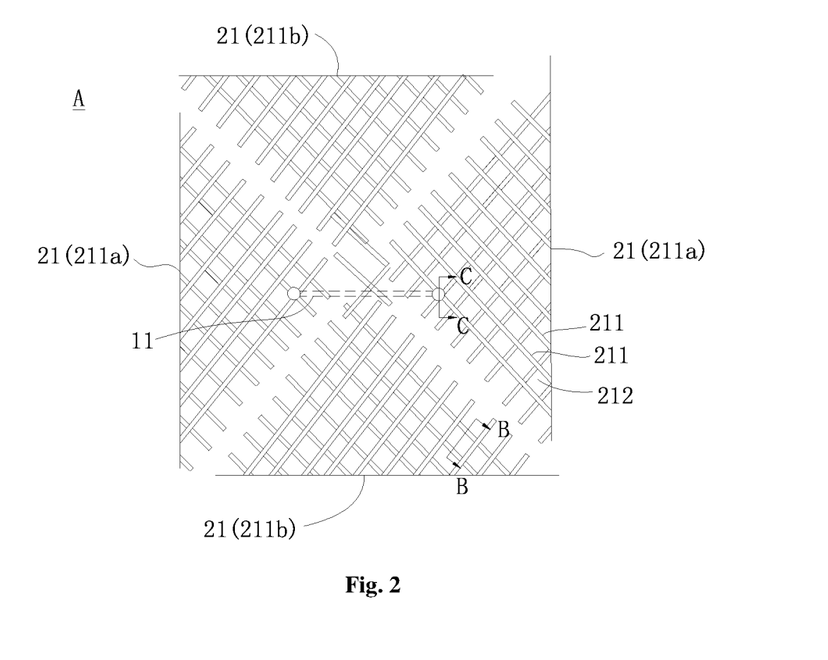
FIG. 2 shows a partially enlarged diagram of area A in FIG. 1.
Figure 3:
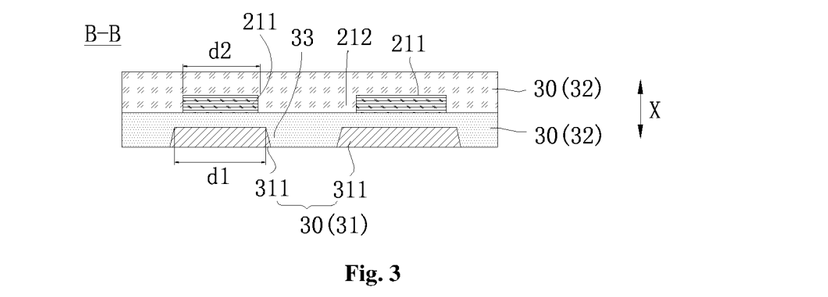
FIG. 3 shows a cross-sectional view of a touch panel along direction B-B in FIG. 2 according to one embodiment of the present application.

As shown in FIGS. 2 and 3, in some optional embodiments, the touch electrode 21 may include a plurality of metal wirings 211 that are intersected, the touch electrode 21 is grid-shaped as a whole and includes grid holes 212, the hollow slots 33 of at least one organic material layer 31 are arranged corresponding to the grid holes 212, and an orthographic projection of the organic material layer 31 in the first direction X covers an orthographic projection of the metal wirings 211 of each of the touch electrodes 21 in the first direction X.

With the above arrangement, the bending performance of the area corresponding to the plurality of metal wirings 211 can be improved to ensure that the metal are completely etched and the reliability in a high temperature and high humidity environment is enhanced.

As an optional implementation, in the first direction X, the organic material layer 31 includes separating lines 311 arranged corresponding to the metal wirings 211 of the touch electrode 21, and an orthographic projection of the separating line 311 completely covers the metal wiring 211 correspondingly arranged.

With the above arrangement, the coverage requirement for the metal wirings 211 can be satisfied, and moreover, the coverage area of the organic material layer 31 in the touch area MM can be further reduced, so as to reduce the residues in the patterning of the first metal layer 10 and/or the second metal layer 20.

As an optional implementation, in the touch panel 100 according to the embodiments of the present application, the orthographic projection of the organic material layer 31 provided with the hollow slots 33 in the first direction X is located in the touch area MM. That is, the organic material layer provided with the hollow slots 33 is arranged only in the touch area MM. With the above arrangement, the coverage area of the organic material layer 31 can be further reduced, so that the metal residues can be reduced when the first metal layer 10 and/or the second metal layer 20 are patterned, and the probability of touch function failure is reduced.

Figure 4:
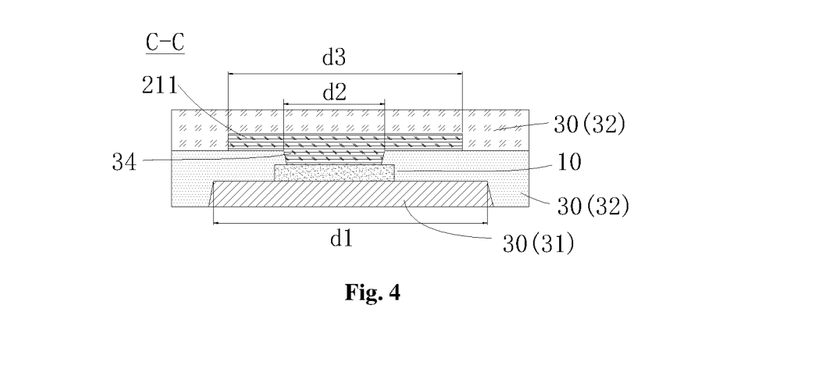
FIG. 4 shows a cross-sectional view of a touch panel along direction C-C in FIG. 2 according to one embodiment of the present application.

As shown in FIGS. 3 and 4, in some optional embodiments, in the touch panel 100 according to the embodiments of the present application, the two or more insulating layers 30 include one organic material layer 31 located at a side of the first metal layer 10 away from the second metal layer 20, and in the first direction X, an orthographic projection of the organic material layer 31 covers an orthographic projection of at least one of the touch electrode 21, the bridging line 11 and the via 34.

With the above arrangement, the metal residues can be reduced when the first metal layer 10 is patterned to form the bridging lines 11, and the water content of the organic film layer during operation is reduced, so as to ensure the reliability of the touch panel 100.

As shown in FIGS. 2 and 3, in some optional examples, the orthographic projection of the organic material layer 31 may cover the touch electrode 21, and optionally, if the touch electrode 21 is in the form of grid-shaped structure formed by a plurality of metal wirings 211, the organic material layer 31 may include the hollow slots 33 arranged corresponding to the grid holes 212, and the orthographic projection of the organic material layer 31 covers the metal wirings 211 of each of the touch electrodes 21.

The organic material layer 31 includes the separating lines 311 arranged corresponding to the metal wirings 211 of the touch electrode 21, and the orthographic projection of the separating line 311 completely covers the metal wiring 211 correspondingly arranged. Optionally, a line width d1 of the separating line 311 is greater than a line width d2 of the metal wiring 211 correspondingly arranged.

As shown in FIG. 4, if one organic material layer 31 is located at the side of the first metal layer 10 away from the second metal layer 20, the orthographic projection of the organic material layer 31 in the first direction X covers the orthographic projection of the touch electrode 21, the bridging line 11 and the via 34 in the first direction X.

The line width of the remaining portion of the organic material layer 31 or the line width d1 of the separating line 311 may be greater than the line width d2 of the metal wiring, and the line width of the remaining portion of the organic material layer 31 may be greater than the radial dimension d3 of the via 34.

If the two or more insulating layers 30 include one organic material layer 31 located at the side of the first metal layer 10 away from the second metal layer 20, the remaining of the insulating layers 30 may all be the inorganic material layers 32, or may all be the organic material layers 31, or may be partly the organic material layers 31 and partly the inorganic material layers 32.

It may be understood that if the two or more insulating layers 30 include one organic material layer 31, this organic material layer 31 is not limited to being located at the side of the first metal layer 10 away from the second metal layer 20.

Figure 5:
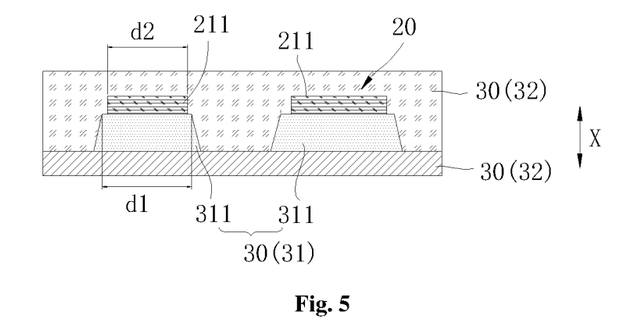
FIG. 5 shows a cross-sectional view of a touch panel along direction B-B in FIG. 2 according to another embodiment of the present application.

As shown in FIG. 5, in some other examples, if the two or more insulating layers 30 include one organic material layer 31, this organic material layer 31 may be located between the first metal layer 10 and the second metal layer 20, the vias 34 may be arranged in the organic material layer 31. The orthographic projection of the organic material layer 31 in the first direction X covers the orthographic projection of the touch electrode 21 in the first direction X. With the above arrangement, the metal residues in the touch area MM can be reduced in the patterning of the first metal layer 10 or the second metal layer 20.

As shown in FIG. 5, the line width d1 of the separating line 311 formed by the organic material layer 31 may be greater than the line width d2 of the metal wiring.

It may be understood that if one organic material layer 31 is located between the first metal layer 10 and the second metal layer 20, in the first direction X, the orthographic projection of the organic material layer 31 may cover not only the orthographic projection of the touch electrode 21.

Figure 6:
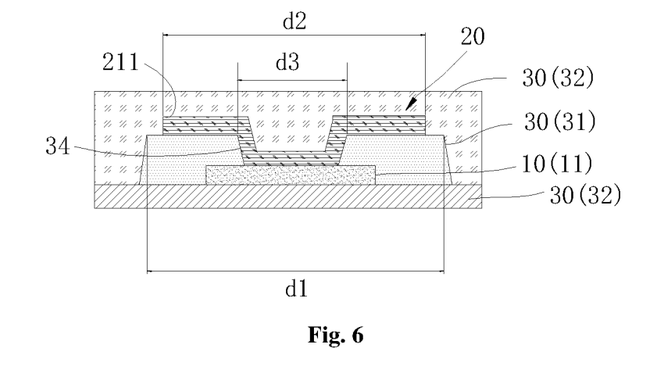
FIG. 6 shows a cross-sectional view of a touch panel along direction C-C in FIG. 2 according to another embodiment of the present application.

As shown in FIG. 6, in some other embodiments, the organic material layer 31 may surround a connection area between the touch electrode 21 and the bridging line 11 and cover a part of the touch electrode 21 and the bridging line 11, and the performance requirement of the touch panel can also be satisfied.

As shown in FIG. 6, the line width d1 of the remaining portion of the organic material layer 31 may be greater than the line width d2 of the metal wiring, and the line width d1 of the remaining portion of the organic material layer 31 may be greater than the radial dimension d3 of the via 34.

Optionally, the line width d1 of the remaining portion of the organic material layer 31 may be understood as the line width, in a direction perpendicular to the first direction X, of the portion of the organic material layer 31 overlapping the metal wiring.

If the two or more insulating layers 30 include one organic material layer 31 located between the first metal layer 10 and the second metal layer 20, the remaining of the insulating layers 30 may all be the inorganic material layers 32, or may all be the organic material layers 31, or may be partly the organic material layers 31 and partly the inorganic material layers 32.

The touch panel 100 according to the embodiments of the present application are described above in which the insulating layers 30 include one organic material layer 31 provided with the hollow slots 33, but in some other embodiments, the two or more insulating layers 30 may include two organic material layers 31.

Figure 7:
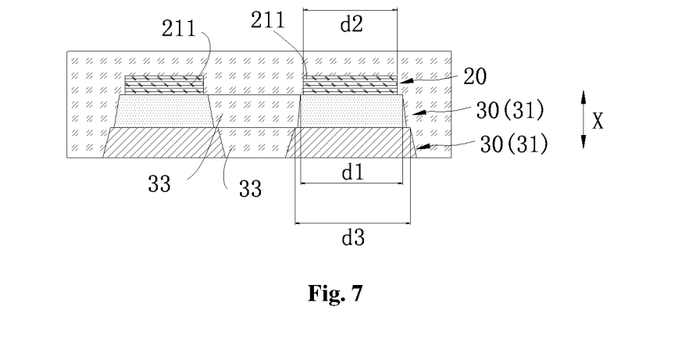
FIG. 7 shows a cross-sectional view of a touch panel along direction B-B in FIG. 2 according to yet other embodiment of the present application.

As shown in FIG. 7, one of the two organic material layers 31 is located at the side of the first metal layer 10 away from the second metal layer 20, and the other of the two organic material layers 31 is located between the first metal layer 10 and the second metal layer 20, so that each of the organic material layers 31 is provided with the hollow slots 33. The orthographic projection of each of the organic material layers 31 in the first direction X covers the orthographic projection of the touch electrode 21 in the first direction X. With the above arrangement, the patterning of the first metal layer 10 and the second metal layer 20 is facilitated to guarantee their bending performance and touch control performance.

In this example, the line width d3 of the remaining portion of the organic material layer 31 located at the side of the first metal layer 10 away from the second metal layer 20 is greater than the line width d2 of the metal wiring 211, and the line width d1 of the remaining portion of the organic material layer 31 located between the first metal layer 10 and the second metal layer 20 is greater than the line width d2 of the metal wiring 211.

Figure 8:
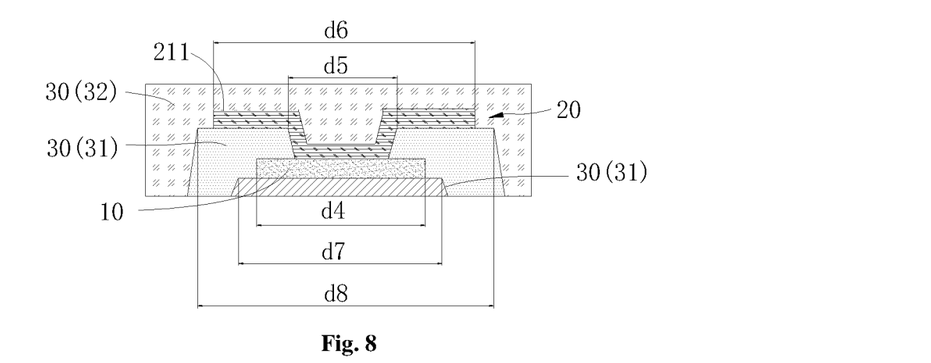
FIG. 8 shows a cross-sectional view of a touch panel along direction C-C in FIG. 2 according to yet other embodiment of the present application.

As shown in FIG. 8, it may be understood that if the plurality of insulating layers 30 include two organic material layers 31 provided with the hollow slots 33, in the first direction X, the organic material layer 31 located at the side of the first metal layer 10 away from the second metal layer 20 surrounds a connection area between the touch electrode 21 and the bridging line 11 and covers a part of the touch electrode 21 and the bridging line 11, and an orthographic projection of the organic material layer 31 located between the first metal layer and the second metal layer 20 covers an orthographic projection of at least one of the touch electrode 21, the bridging line 11 and the via 34, the performance requirement of the touch panel 100 can also be satisfied.

Optionally, the connection area between the touch electrode 21 and the bridging line 11 may be understood as the area where the touch electrode 21 overlaps and contacts the bridging line 11 in the first direction X.

In the embodiment, the line width of the bridging line 11 may be d4, the radial dimension of the via 34 may be d5, the line width of the metal wiring 211 of the touch electrode 21 may be d6, the line width of the portion of the organic material layer 31 located at the side of the first metal layer 10 away from the second metal layer 20 corresponding to the via 34 may be d7, and the line width of the portion of the organic material layer 31 located between the first metal layer 10 and the second metal layer 20 corresponding to the metal wiring 211 may be d8, in which d5<d4, d7>d6 and d7>d4, and d8 may be greater than d7.

Figure 9:
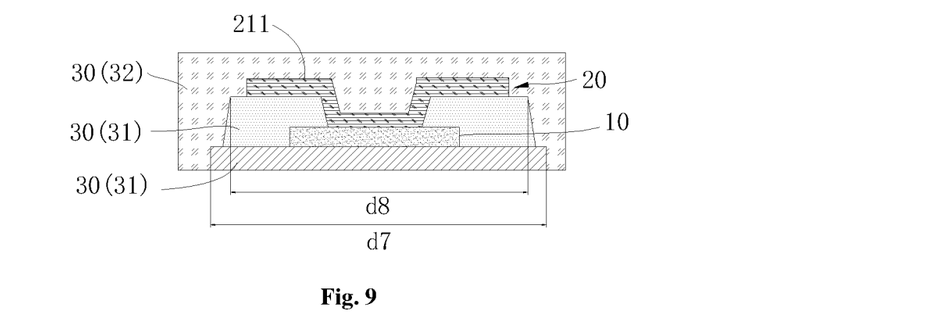
FIG. 9 shows a cross-sectional view of a touch panel along direction C-C in FIG. 2 according to yet other embodiment of the present application.

As shown in FIG. 9, in some embodiments, d8 may be less than d7.

Optionally, if the plurality of insulating layers 30 include two organic material layers 31, the remaining of the insulating layers 30 may all be the inorganic material layers 32, or may all be the organic material layers 31, or may be partly the organic material layers 31 and partly the inorganic material layers 32.

If the plurality of insulating layers 30 include two organic material layers 31, the two organic material layers 31 are not limited to one of them being located at the side of the first metal layer 10 away from the second metal layer 20 in the first direction X.

Figure 1:
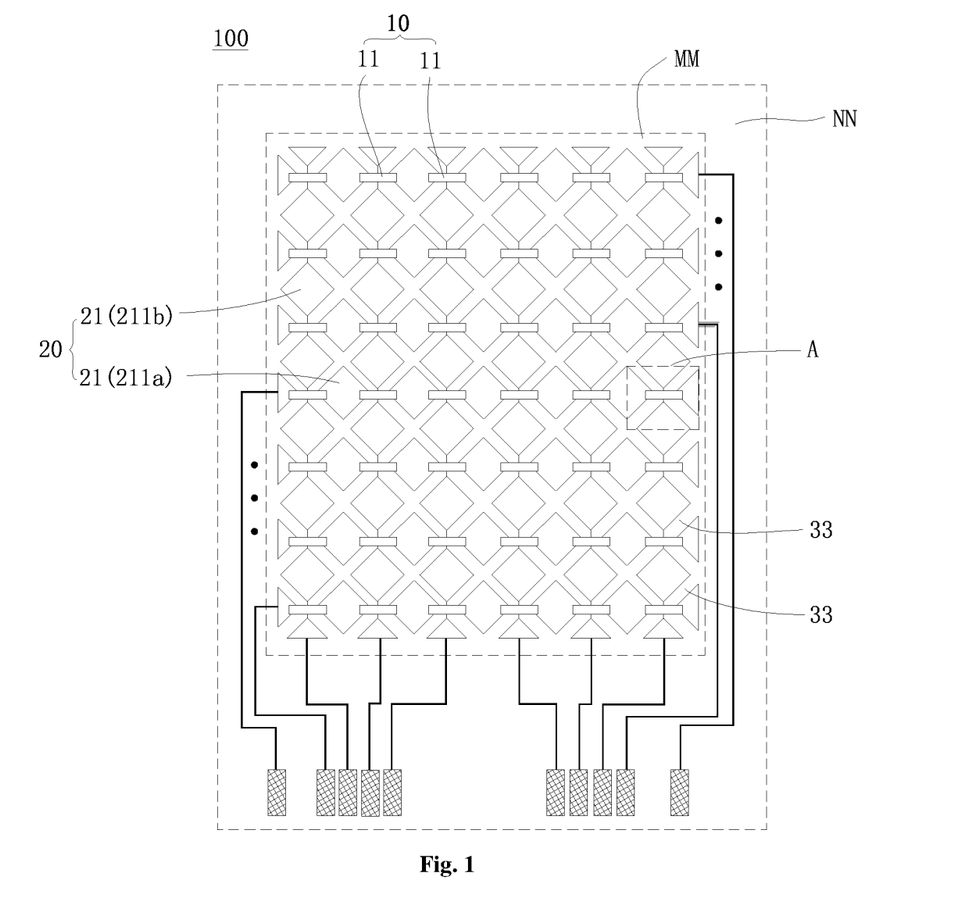
FIG. 1 shows a schematic structural diagram of a touch panel according to one embodiment of the present application.
Figure 10:
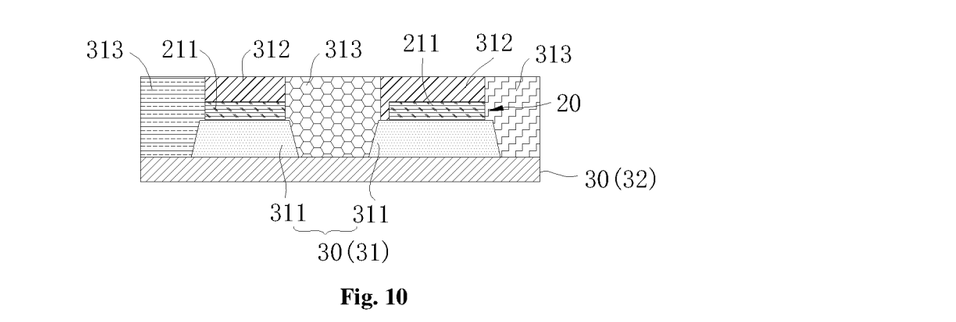
FIG. 10 shows a cross-sectional view of a touch panel along direction B-B in FIG. 2 according to yet other embodiment of the present application.

As shown in FIGS. 1 and 10, it may be understood that in some embodiments, one of the two organic material layers 31 may be located between the first metal layer 10 and the second metal layer 20 and provided with the hollow slots 33, and the other of the two organic material layers 31 may be located at a side of the second metal layer 20 away from the first metal layer 10 and has an orthographic projection, in the first direction X, located in the touch area MM and the peripheral area NN. With the above arrangement, the probability of touch function failure due to the metal residues can also be reduced.

In the touch panel 100 according to the embodiments of the present application, if the insulating layer 30 located between the first metal layer 10 and the second metal layer 20 is the organic material layer 31 and/or the insulating layer 30 located at the side of the second metal layer 20 away from the first metal layer 10 is the organic material layer 31, one of the two organic material layers 31 may include black matrices 312 and light filtering units 313 arranged in the black matrices 312, and the light filtering units 313 are arranged corresponding to light-emitting elements 222. With the above arrangement, the thickness of the touch panel 100 can be reduced and the bending performance can be improved. Moreover, when the touch panel 100 is applied in a display apparatus, the reflected light from the cathode and the touch electrode 21 to the external light source can be absorbed, the display effect is improved and the color deviation is decreased.

Figure 11:
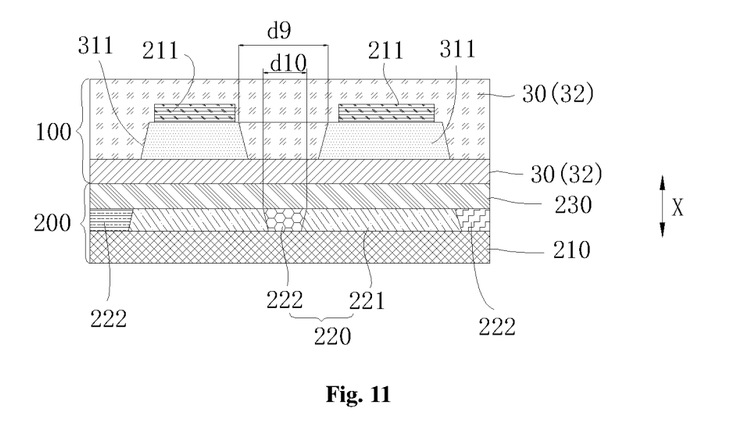
FIG. 11 shows a schematic structural diagram of a display apparatus according to one embodiment of the present application.

As shown in FIG. 11, in another aspect, the embodiments of the present application further provide a display apparatus including a display panel 200 and the touch panel 100 according to the above various embodiments, the display panel 200 includes an array substrate 210, a light-emitting layer 220, and an encapsulation layer 230 being stacked, the light-emitting layer 220 includes a pixel definition layer 221 with pixel openings and light-emitting elements 222 located within the pixel openings, the encapsulation layer 230 is arranged at a side of the light-emitting layer 220 away from the array substrate 210 and covers the light-emitting layer 220, and the touch panel 100 is arranged at a side of the encapsulation layer 230 away from the light-emitting layer 220.

In the display apparatus according to the embodiments of the present application, the display requirement can be satisfied by the display panel 200. The touch panel 100 according to the above various embodiments is included, the two or more insulating layers 30 of the touch panel 100 include one or more organic material layers 31, which is beneficial for the bending of the touch panel 100. A part of at least one organic material layer 31 located in the touch area MM is provided with the hollow slots 33, and in the first direction X, the orthographic projection of the organic material layer 31 provided with the hollow slots 33 covers at least part of the touch electrodes 21, the touch electrodes 21 can be protected, which is beneficial for their bending. The provision of the hollow slots 33 can reduce the coverage area of the organic material layer 31 in the touch area MM, therefore when the metal layers are patterned to form the touch electrodes 21 and/or the bridging lines 11, the atmospheric viscosity can be decreased to avoid short circuit caused by the metal residues, etc., and thus to reduce the probability of touch function failure and increase the yield of the display panel 200.

As an optional implementation, in the display apparatus according to the embodiments of the present application, if the layer structure of the encapsulation layer 230 facing the touch panel 100 is the organic material layer 31, the first metal layer 10 or the second metal layer 20 may be directly molded on the encapsulation layer 230.

In the display apparatus according to the embodiments of the present application, the touch panel 100 may be bonded to the encapsulation layer 230 after being manufactured, or may be molded on the encapsulation layer 230 layer by layer.

As an optional implementation, in the display apparatus according to the embodiments of the present application, if the touch electrode 21 of the touch panel 100 includes a plurality of metal wirings 211 that are intersected, the touch electrode 21 is grid-shaped as a whole and includes grid holes 212, and in the first direction X, at least one of the organic material layers 31 includes the hollow slots 33 arranged corresponding to the grid holes 212, a radial dimension d9 of the hollow slot 33 is greater than a radial dimension d10 of the pixel opening, then an absolute value of a difference between the radial dimension of the hollow slot 33 and the radial dimension of the pixel opening is less than or equal to 5 microns. That is, the difference between the radial dimension d9 of the hollow slot 33 and the radial dimension d10 of the pixel opening is in a range of −5 microns to 5 microns. With the above arrangement, the touch control precision and the light-emitting efficiency can be ensured.

If the orthographic projection of the hollow slot 33 in the first direction X is a circle, the radial direction of the hollow slot 33 may be understood as the radial direction of the outer contour of the circle. If the orthographic projection of the hollow slot 33 in the first direction X is a polygon, the radial direction of the hollow slot 33 may be understood as the radial direction of the circumcircle or the incircle of the polygon.

Figure 12:
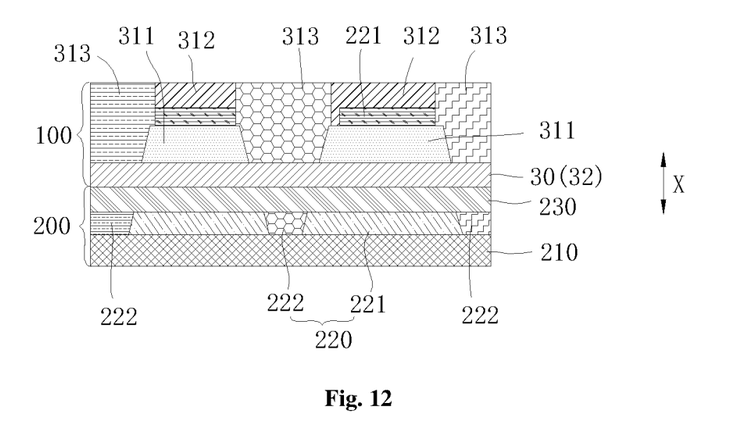
FIG. 12 shows a schematic structural diagram of a display apparatus according to another embodiment of the present application.

As shown in FIG. 12, as an optional implementation, in the display apparatus according to the embodiments of the present application, if one organic material layer 31 of the touch panel 100 includes the black matrices 312 and the light filtering units 313 arranged in the black matrices 312, and the light filtering units 313 are arranged corresponding to light-emitting elements 222, the color of the light filtering unit 313 is corresponding to the color of the light-emitting element 222. For example, the red light-emitting element 222 is corresponding to the red light filtering unit 313, the blue light-emitting element 222 is corresponding to the blue light filtering unit 313, and the green light-emitting element 222 is corresponding to the green light filtering unit 313. The light filtering effect is guaranteed, the reflected light from the cathode of the light-emitting element 222 and the touch electrode 21 of the touch panel 100 to the external light source are absorbed, the display effect is improved and the color deviation is decreased.

Although the present application has been described with reference to the preferred embodiments, various improvements can be made and the components therein may be replaced with equivalents without departing from the scope of the present application. In particular, as long as there is no structural conflict, the various technical features described in the various embodiments can be combined in any manner. The present application is not limited to the particular embodiments disclosed herein, but includes all technical solutions falling within the scope of the claims.

What is claimed is:

1. A touch panel comprising a touch area and a peripheral area arranged surrounding the touch area, the touch panel further comprising:
   a first metal layer comprising a plurality of bridging lines;
   a second metal layer spaced apart from the first metal layer in a first direction and comprising a plurality of touch electrodes, at least part of the touch electrodes being electrically connected with the bridging lines through one or more vias;
   two or more insulating layers arranged in stack with the first metal layer and the second metal layer in the first direction, at least one of the two or more insulating layers being located between the first metal layer and the second metal layer; and
   wherein the two or more insulating layers comprise one or more organic material layers, a part of at least one of the one or more organic material layers located in the touch area is provided with one or more hollow slots, and an orthographic projection of the at least one of the one or more organic material layers provided with the hollow slots in the first direction covers an orthographic projection of at least part of the touch electrodes in the first direction, and
   wherein the one or more hollow slots extend through an entire thickness of the part of at least one of the one or more organic material layers in which the one or more hollow slots are provided.

2. The touch panel of claim 1, wherein an orthographic projection of the organic material layer provided with the hollow slots in the first direction is located in the touch area.

3. The touch panel of claim 1, wherein the two or more insulating layers comprise one organic material layer located at a side of the first metal layer away from the second metal layer, and an orthographic projection of the organic material layer in the first direction covers an orthographic projection of at least one of the touch electrode, the bridging line and the via in the first direction.

4. The touch panel of claim 1, wherein the two or more insulating layers comprise one organic material layer located between the first metal layer and the second metal layer, the vias are arranged in the organic material layer, and an orthographic projection of the organic material layer in the first direction covers an orthographic projection of the touch electrode in the first direction.

5. The touch panel of claim 1, wherein the two or more insulating layers comprise one organic material layer located between the first metal layer and the second metal layer, the vias are arranged in the organic material layer, and in the first direction, the organic material layer surrounds a connection area between the touch electrode and the bridging line and covers a part of the touch electrode and the bridging line.

6. The touch panel of claim 1, wherein the two or more insulating layers comprise two organic material layers, one of the organic material layers is located at a side of the first metal layer away from the second metal layer, the other of the organic material layers is located between the first metal layer and the second metal layer, and each of the organic material layers is provided with the hollow slots; and
   in the first direction, an orthographic projection of each of the organic material layers covers an orthographic projection of the touch electrode.

7. The touch panel of claim 1, wherein the two or more insulating layers comprise two organic material layers, one of the organic material layers is located at a side of the first metal layer away from the second metal layer, the other of the organic material layers is located between the first metal layer and the second metal layer, and each of the organic material layers is provided with the hollow slots; and in the first direction, the organic material layer located at the side of the first metal layer away from the second metal layer surrounds a connection area between the touch electrode and the bridging line and covers a part of the touch electrode and the bridging line, and an orthographic projection of the organic material layer located between the first metal layer and the second metal layer covers an orthographic projection of at least one of the touch electrode, the bridging line and the via.

8. The touch panel of claim 1, wherein the two or more insulating layers comprise two organic material layers, one of the organic material layers is located between the first metal layer and the second metal layer and provided with the hollow slots, and the other of the organic material layers is located at a side of the second metal layer away from the first metal layer and has an orthographic projection, in the first direction, located in the touch area and the peripheral area.

9. The touch panel of claim 1, wherein one of the one or more organic material layers comprises black matrices and light filtering units arranged in the black matrices, and the light filtering units are arranged corresponding to light-emitting elements.

10. The touch panel of claim 1, wherein the hollow slot is a round slot, a square slot or a polygonal slot.

11. The touch panel of claim 1, wherein a number of the hollow slots is two or more.

12. The touch panel of claim 1, wherein an orthographic projection of each of the touch electrodes in the first direction at least partially overlaps with the organic material layer.

13. The touch panel of claim 1, wherein the touch electrode comprises a plurality of metal wirings that are intersected, the touch electrode is grid-shaped as a whole and comprises grid holes, and in the first direction, at least one of the organic material layers comprises the hollow slots arranged corresponding to the grid holes, an orthographic projection of the organic material layer covers the metal wirings of each of the touch electrodes.

14. The touch panel of claim 13, wherein in the first direction, the organic material layer comprises separating lines arranged corresponding to the metal wirings of the touch electrode, and an orthographic projection of the separating line completely covers the metal wiring correspondingly arranged.

15. The touch panel of claim 14, wherein a line width of the separating line is greater than a line width of the metal wiring correspondingly arranged.

16. A display apparatus comprising:
a display panel comprising an array substrate, a light-emitting layer, and an encapsulation layer being stacked, the light-emitting layer comprising a pixel definition layer with pixel openings and light-emitting elements located within the pixel openings, the encapsulation layer being arranged at a side of the light-emitting layer away from the array substrate and covering the light-emitting layer; and
the touch panel of claim 1 arranged at a side of the encapsulation layer away from the light-emitting layer.

17. The display apparatus of claim 16, wherein the touch electrode comprises a plurality of metal wirings that are intersected, the touch electrode is grid-shaped as a whole and comprises grid holes, and in the first direction, at least one of the organic material layers comprises the hollow slots arranged corresponding to the grid holes, a radial dimension of the hollow slot is greater than a radial dimension of the pixel opening.

18. The display apparatus of claim 16, wherein an absolute value of a difference between the radial dimension of the hollow slot and the radial dimension of the pixel opening is less than or equal to 5 microns.

19. The touch panel of claim 1, wherein insulating material is provided inside the one or more hollow slots.

20. The touch panel of claim 1, wherein the orthographic projection of the at least one of the one or more organic material layers provided with the hollow slot(s) in the first direction covers an orthographic projection of the plurality of bridging lines in the first direction, and
wherein an orthographic projection of the hollow slot(s) in the first direction does not overlap with the orthographic projection of the plurality of bridging lines in the first direction.

* * * * *